(12) United States Patent
LaCour

(10) Patent No.: US 7,681,901 B2
(45) Date of Patent: Mar. 23, 2010

(54) GAUGE MOUNT FOR MOTORCYCLE

(76) Inventor: Kerry J. LaCour, 5527 Highway 331 South, DeFuniak Springs, FL (US) 32435

( * ) Notice: Subject to any disclaimer, the term of this patent is extended or adjusted under 35 U.S.C. 154(b) by 289 days.

(21) Appl. No.: 11/784,259

(22) Filed: Apr. 6, 2007

(65) Prior Publication Data

US 2008/0246250 A1 Oct. 9, 2008

(51) Int. Cl.
*B62J 9/00* (2006.01)
*B62K 21/18* (2006.01)
(52) U.S. Cl. .................................... 280/288.4; 280/279
(58) Field of Classification Search .................. 280/276, 280/279, 280, 288.4; 73/493
See application file for complete search history.

(56) References Cited

U.S. PATENT DOCUMENTS

| | | | | |
|---|---|---|---|---|
| 2,329,249 A | * | 9/1943 | Carlson | 235/96 |
| 3,375,024 A | * | 3/1968 | Bowden | 280/288.3 |
| 4,373,741 A | * | 2/1983 | Resele et al. | 280/279 |
| 4,630,160 A | * | 12/1986 | Murayama | 360/137 |
| 4,687,072 A | * | 8/1987 | Komuro | 180/219 |
| 5,109,942 A | * | 5/1992 | Akimori et al. | 180/219 |
| 5,869,907 A | * | 2/1999 | Marler | 307/10.1 |
| 5,967,178 A | | 10/1999 | Shrode | |
| 6,158,279 A | * | 12/2000 | Saiki | 73/493 |
| 6,167,849 B1 | | 1/2001 | Wilson | |
| 6,176,503 B1 | | 1/2001 | George | |
| 6,688,175 B2 | * | 2/2004 | Ogura et al. | 73/493 |
| 6,868,843 B2 | | 3/2005 | Yasui | |
| 7,040,306 B2 | | 5/2006 | Moriyama et al. | |
| 7,104,261 B2 | | 9/2006 | Nishi et al. | |
| 7,271,760 B2 | * | 9/2007 | Bartosik et al. | 342/20 |
| 2003/0226553 A1 | | 12/2003 | Yasui | |
| 2009/0007714 A1 | * | 1/2009 | Carlini | 74/492 |

FOREIGN PATENT DOCUMENTS

DE 10247920 A1 * 4/2004

* cited by examiner

*Primary Examiner*—Lesley Morris
*Assistant Examiner*—Daniel Yeagley
(74) *Attorney, Agent, or Firm*—J. Wiley Horton

(57) ABSTRACT

A gauge mount for a motorcycle with a gauge encasement attached to a triple tree and one or more gauge mount locations attached to the gauge encasement. The gauge mount locations are located on the rearward facing side of the triple tree, facing the seat of the motorcycle. Each gauge mount location is adapted to receive a gauge housing. Each gauge housing connects a gauge to the gauge encasement. The gauges are preferably tilted upward to be more easily viewed by the rider while operating the motorcycle.

20 Claims, 9 Drawing Sheets

GAUGE MOUNT FOR MOTORCYCLE

BACKGROUND OF THE INVENTION

1. Field of the Invention

This invention relates to the field of motorcycles. More specifically, the invention comprises a gauge mount modified for attachment to the triple tree of a motorcycle.

2. Description of the Related Art

A motorcycle, in its basic form, is any vehicle with two-wheels, a frame, handlebars and an engine. Typically, the front wheel and accompanying suspension are attached to the frame by a structure called a triple-tree. As illustrated in FIG. 1 the fork tubes 14, handle bars 28 and a pivot joint 24 attach to the triple tree 34 (shown as hidden lines in the view). The pivot joint allows the structures attached to the triple tree to rotate, turning the front wheel and steering the motorcycle in the desired direction. FIG. 2 shows a side perspective view of the pivot joint. The triple tree is attached to the frame of the motorcycle by the pivot joint. The fork tubes run vertically from each of the front wheels of the motorcycle to the triple tree. The handle bars can either attach directly to the top of the triple tree or attach to the triple tree through a riser structure. The riser structure would attach to the triple tree and the handle bars would then connect to the riser, raising the handlebars above the triple tree.

Motorcycle appearance is constantly changing to suit customer tastes. Manufacturers try to make motorcycles appear as sleek as possible. This is often difficult to do with the state of the art placement of the gauges. Gauge mounts for motorcycles are typically mounted to the top of the handlebars, the riser structure, or to the top of the motorcycle frame. A good example of prior art gauge mounts is disclosed in U.S. Pat. No. 6,176,503 to George (2001). FIG. 7 of the George disclosure illustrates a gauge (prior art reference numeral 84) attached to cross member (prior art reference numeral 44) of riser structure (prior art reference numeral 32). These attachment mechanisms are cluttered in appearance and only allow a limited number of gauges for the motorcycle. This is primarily due to the lack of space available on or around these regions. The limited number of gauges restricts the available data that the rider has access to concerning the ongoing functioning of the motorcycle. In contrast, an automobile operator may have access to several different gauges at all times.

Gauges have not previously been mounted on the rearward facing side of the triple tree and fork tube area. This space is particularly attractive because while the rider has a direct line of sight to the rearward facing area, this area is not visible to someone observing the motorcycle. Thus, gauges placed in this area do not disturb a motorcycle's "clean" appearance. The rearward facing side of the triple tree is not presently used. The attachment of gauges on or around this area will therefore increase the data available to the rider.

BRIEF SUMMARY OF THE INVENTION

The present invention comprises a gauge mount system for attaching gauges to the rearward facing side of a motorcycle triple tree. The triple tree attaches the fork tubes, which comprise the front suspension, and the handle bars to the motorcycle frame via a pivot joint. The pivoting attachment allows for steering by manipulating the force applied to the handle bars. The force causes the triple tree, and thus the fork tubes and front wheel, to rotate.

In the present invention, a gauge encasement structure encloses a portion of the triple tree and fork tubes. The gauge mount location is on the rearward facing side of the triple tree. It is in a position which the rider can easily see while riding the motorcycle. At the same time the gauges are largely hidden from the view of an external observer.

In the preferred embodiment, the gauge encasement is attached in the area where the triple tree and fork tubes meet. The gauge encasement can be attached either directly or indirectly to the triple tree. Gauges attach to the gauge encasement through an attachment mechanism. One such attachment mechanism is accomplished by way of a gauge housing. The gauge housing bolts into the gauge encasement by two bolts starting from the inside of the encasement going through the encasement and into the backside of the gauge housing. A gauge, consisting of a mounting stud or studs, gauge body and a gauge face, inserts horizontally into the gauge housing. The mounting stud fits into the middle of the gauge housing and is secured in place. The gauge body fits snugly into the gauge housing allowing the gauge face to be visible to the rider.

The gauge encasement encloses various tubes and cables, creating a more sleek appearance. By allowing for the gauges to be attached to the gauge encasement, any gauges attached to the handlebars can be eliminated and the handlebars will appear cleaner and be less distracting to the rider. Along with cleaning up the appearance of the handlebars, the elimination of the gauges from the handlebars would, in the event of an accident, reduce the risk of the rider being injured by contacting the gauges. On the other hand, the additional gauge locations can simply allow the rider to have access to a greater number of gauges.

REFERENCE NUMERALS IN THE DRAWINGS

| | | | |
|---|---|---|---|
| 10 | gauge body | 12 | gauge housing |
| 14 | fork tube | 16 | gauge bolt |
| 18 | side encasement bolt | 20 | headlight |
| 22 | gauge encasement | 24 | pivot joint |
| 26 | frame | 28 | handle bar |
| 30 | gauge | 32 | mounting stud |
| 34 | triple tree | 36 | gauge face |
| 38 | front panel | 40 | left gauge panel |
| 42 | right gauge panel | 44 | handle bar |
| 46 | first gauge mount location | 48 | second gauge mount location |
| 50 | rear encasement bolt | 52 | mounting stud nut |

-continued

| 54 | front wheel | 56 | prefabricated triple tree cover |
| 58 | seat | | |

DETAILED DESCRIPTION OF THE INVENTION

Figure 1:
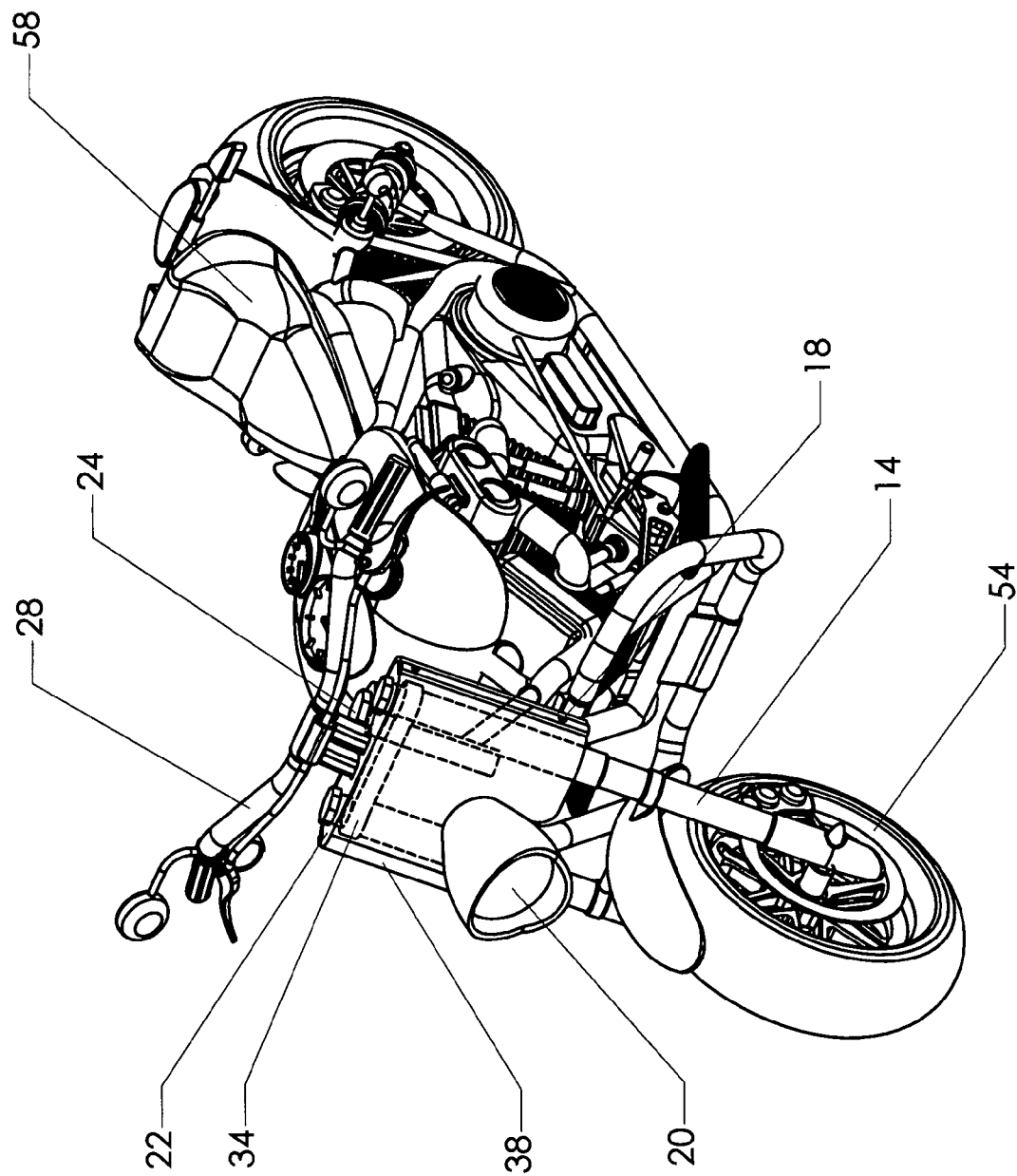
FIG. 1 is a perspective view, showing the present invention and the clean appearance of the triple tree area.

FIG. 1 shows the present invention comprising a gauge mount system attached to a motorcycle. This view is from the perspective of an external observer. The motorcycle appears sleek since the gauge mount locations, being on the rear of gauge encasement 22, are largely hidden from an external observer. As the reader will observe in FIG. 2 the position of first gauge mount location 46 and second gauge mount location 48 on the rearward facing side of gauge encasement 22 allows a rider to see the gauges while simultaneously concealing them from an external observer. Returning to FIG. 1, gauge encasement 22 preferably encloses and covers a portion of first and second fork tube 14 and a portion of handle bar 28. Front panel 38 of gauge encasement 22 is cut to fit around headlight 20 of the motorcycle. Gauge encasement 22 is attached either directly or indirectly to triple tree 34. Triple tree 34 is the part of a motorcycle which secures together handle bar 28, fork tube 14 and pivot joint 24. The upper portion of fork tube 14 is connected to triple tree 34. The lower portion of fork tube 14 is connected to front wheel 54. When a force is applied to handle bar 24 the triple tree 34 rotates about pivot joint 24. The connection of fork tube 14 from triple tree 34 to front wheel 54 enables front wheel 54 to move in conjunction with the force applied to handle bar 28.

In one embodiment of the present invention, gauge encasement 22 is made up of three panels: left gauge panel 40, right gauge panel 42 and front panel 38. A top view of these three panels can be seen in FIG. 4. Other embodiments of gauge encasement 22 could comprise one panel which fits around triple tree 34, or a two panel version which splits around headlight 20. Embodiments including four or more panels are possible.

Figure 2:
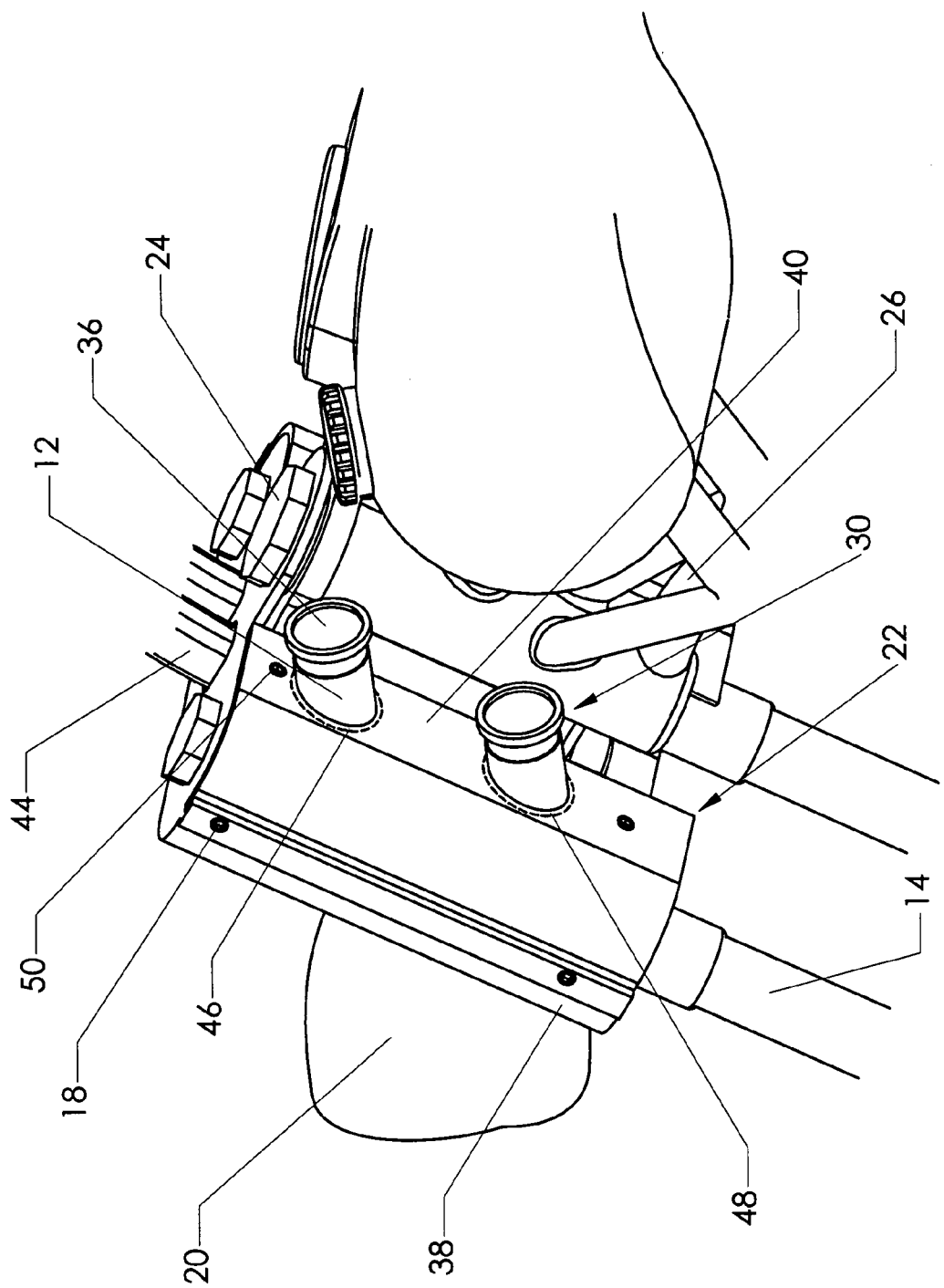
FIG. 2 is a perspective view, showing the gauge encasement mounted on the rearward facing surface of the triple tree.

FIG. 2 shows gauge housing 12 installed on left gauge panel 40 of gauge encasement 22. This view illustrates the available space for gauges 30 on the rearward facing side of gauge encasement 22. First gauge mount location 46 and second gauge mount location 48 are positioned on left gauge panel 40. First gauge mount location 46 and second gauge mount location 48 could also be positioned on right gauge panel 42, as seen from a top view in FIG. 4. Returning to FIG. 2, first gauge housing 12 is positioned at first gauge mount location 46 and a second gauge housing 12 is positioned at second gauge mount location 48. Second gauge mount location 48 is vertically offset from first gauge mount location 46. The location of a particular gauge 30 can be positioned on or around any area of gauge encasement 22, so long as it is visible to the rider. Additionally, any different number or size of gauges 30 could be installed.

Figure 5:
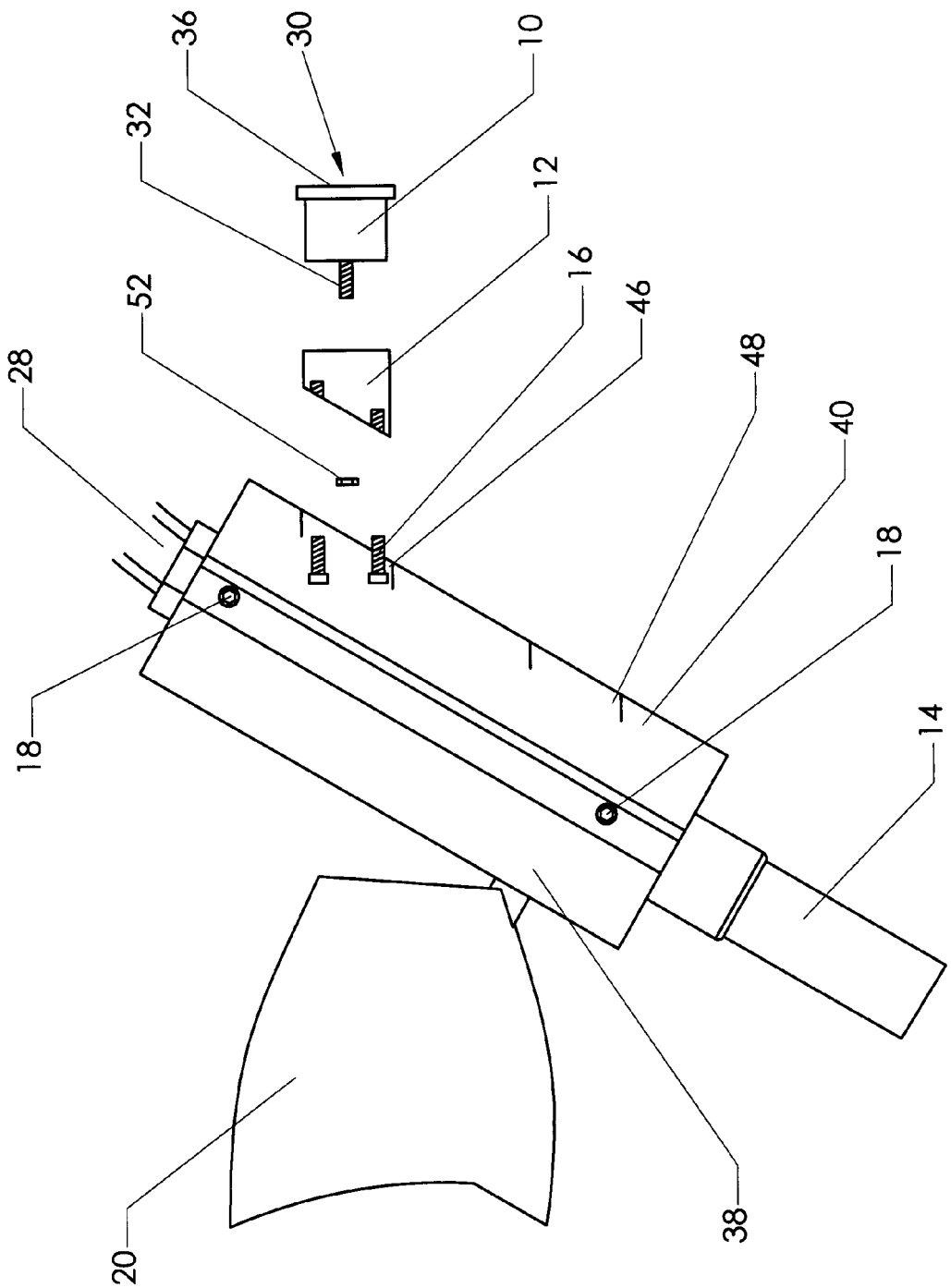
FIG. 5 is an exploded side view, showing one attachment means for a gauge mount.

As the reader will observe in FIG. 5 gauge body 10 fits inside of gauge housing 12. Gauge face 36 and gauge body 10 are typically one unit making up gauge 30. Returning to FIG. 2, the reader will observe how gauge face 36 slightly protrudes out from gauge housing 12. Gauge face 36 is preferably tilted slightly upward to aid visibility. In the embodiment illustrated the upward tilt is provided by the geometry of gauge housing 12, which is inclined with respect to left gauge panel 40. Thus, gauge face 36 is more easily visible to the rider while operating the motorcycle. The reader should note the effective utilization of previously unused space on the rearward facing portion of triple tree 34 which gauge encasement 22 surrounds. Left gauge panel 40 extends inward to a point proximate pivot joint 24.

Figure 3:
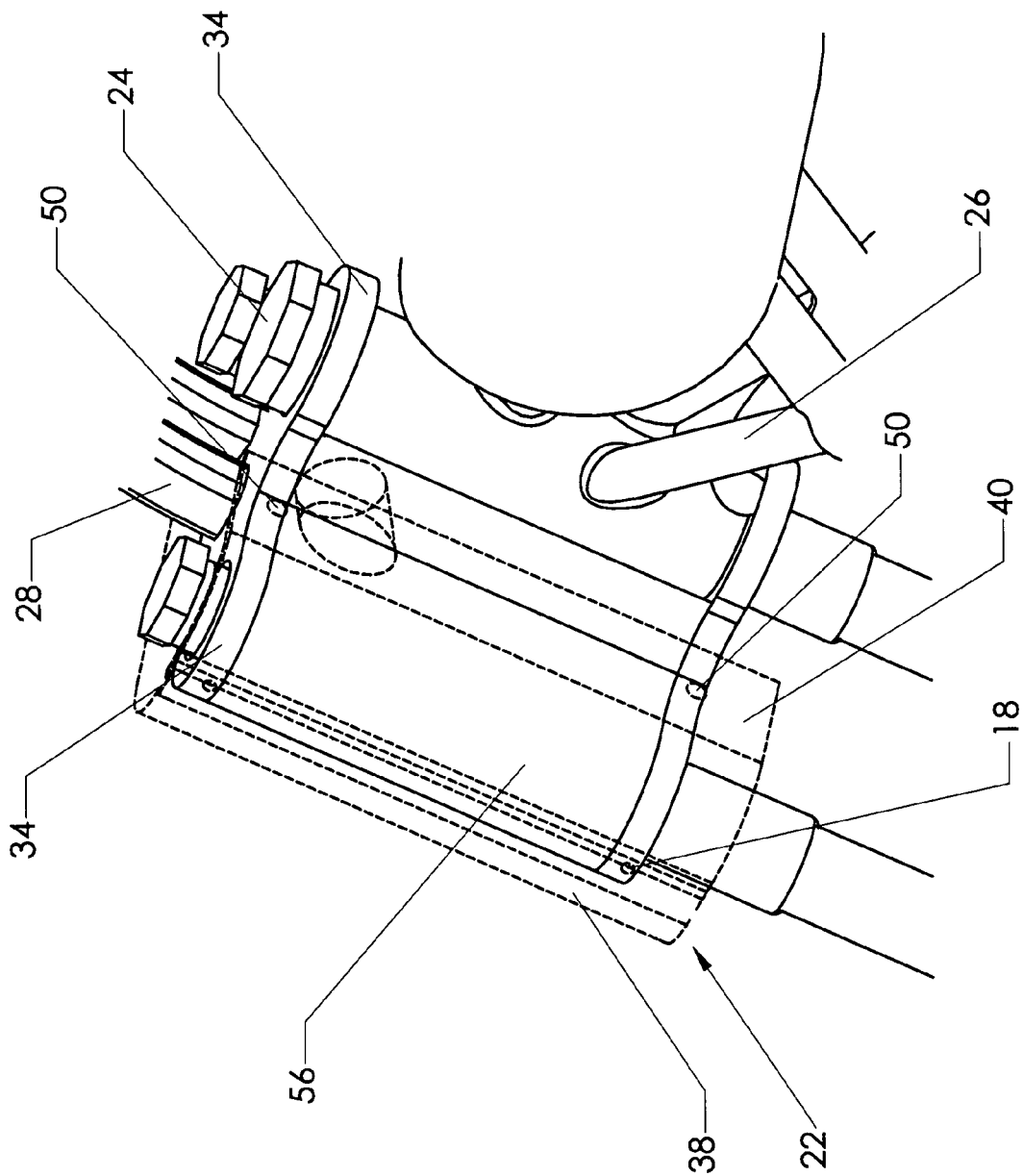
FIG. 3 is a perspective view, showing the components which are shrouded by the gauge encasement.

FIG. 3 illustrates the triple tree area of the motorcycle with gauge encasement 22 stripped away. The outline of the gauge encasement is shown in dashed lines. Gauge encasement 22 covers and hides a portion of triple tree 34, fork tube 14, handle bar 28 and any tubing or cabling required. The result is a "clean" appearance. Triple tree 34 is connected to handle bar 28 at the base of handle bar 28. The upper portion of fork tube 14 is connected to triple tree 34 on either side of handle bar 28. Pivot joint 24 is connected to triple tree 34 on the rearward facing side of triple tree 34. Pivot joint 24 pivotally connects triple tree 34 to frame 26 of the motorcycle. First and second fork tube 14 protrude downward out of the gauge encasement 22. Handle bar 28 exits the top of the gauge encasement 22.

There can be many different ways to attach gauge encasement 22 around or to triple tree 34. For example, gauge encasement 22 could attach to triple tree 34 by bolting either directly or indirectly to triple tree 34, by frictional engagement, by molding to fit over triple tree 34 and snap into place, or by many other known methods. Thus, the details set out in the preceding paragraphs should be viewed simply as one example selected from many possibilities.

Figure 4:
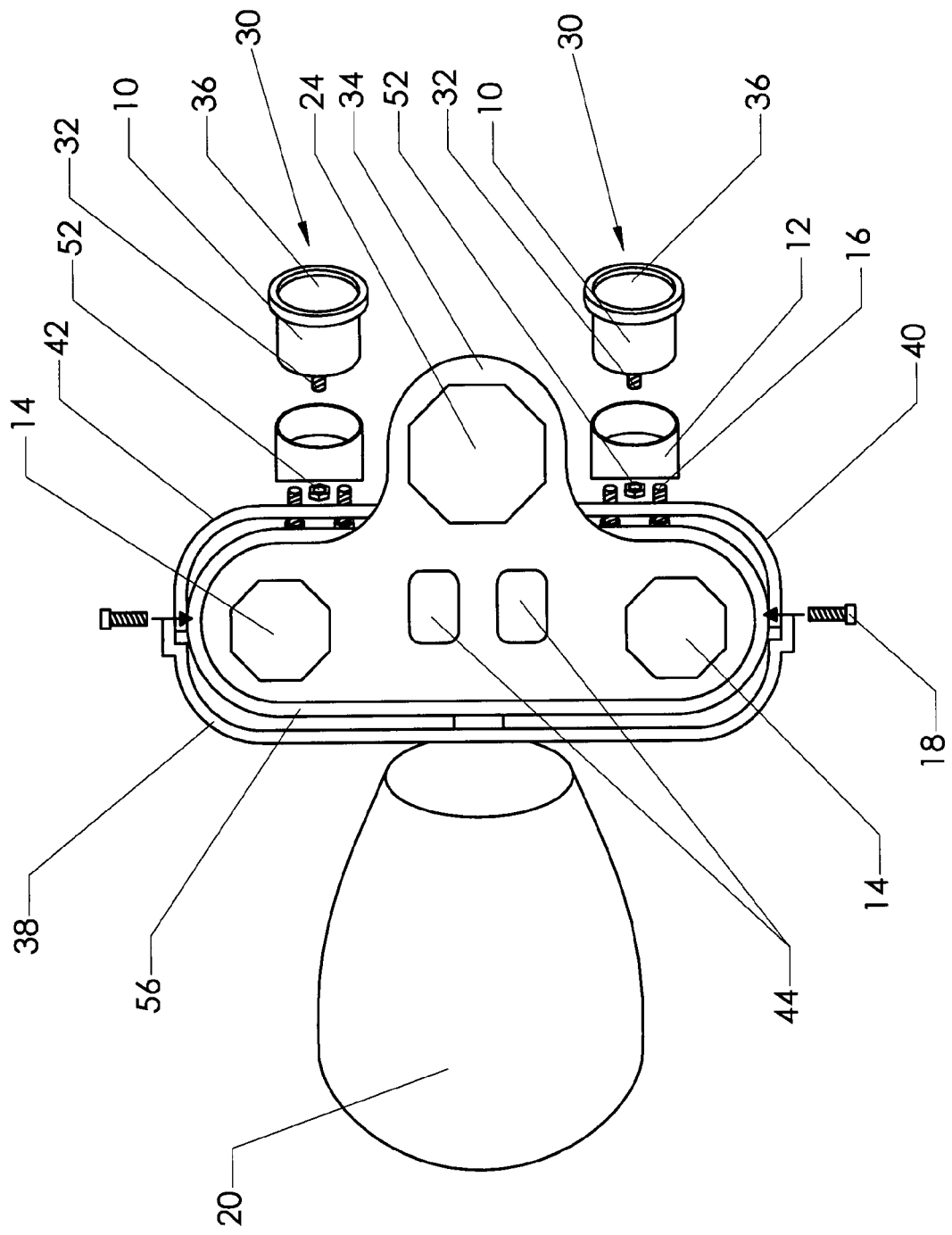
FIG. 4 is an exploded top view, showing one attachment means for a gauge mount.

FIG. 4 shows a view looking down at the motorcycle from above. Headlight 20 is located on the forward facing side of triple tree 34. In the embodiment shown, front panel 38, left gauge panel 40 and right gauge panel 42 combine to form gauge encasement 22. Front panel 38 is relieved to fit around headlight 20. Front panel 38 is attached to left gauge panel 40 by side encasement bolt 18. Side encasement bolt 18 penetrates first through front panel 38, then through left gauge panel 40 and into a threaded hole in prefabricated triple tree cover 56. Prefabricated triple tree cover 56 is a cover which fits snugly over triple tree 34 and contains female receptors for bolts. Front panel 38 is also attached to right gauge panel 42 by side encasement bolt 18. Side encasement bolt 18 screws into front panel 38, then through right gauge panel 42, and into triple tree cover 56. As illustrated in FIG. 3, left gauge panel 40 is attached to the rearward facing side of triple tree 34, or prefabricated triple tree cover 56, by rear encasement bolt 50. Rear encasement bolt 50 penetrates through left gauge panel 40 into triple tree cover 56 or triple tree 34 on both the upper portion of left gauge panel 40 and the lower portion of left gauge panel 40. Right gauge panel 42 is connected to the rearward facing side of triple tree 34 in the same manner. While left gauge panel 40 and right gauge panel 42 are similar in construction, gauges 30 may have different locations on each panel.

Returning now to FIG. 4, the reader will observe that gauge bolt 16 screws outward through a hole in gauge encasement 22 (not shown) into gauge housing 12. Another illustration of this mechanism for attachment is shown in FIG. 5. Gauge 30 could be secured to gauge housing 12 by many different methods. For example, gauge 30 could snap into place within gauge housing 12. In the view shown by FIG. 5, gauge body 10 fits into gauge housing 12. Gauge housing 12 encases gauge body 10. Gauge face 36 slightly protrudes from gauge housing 12. Gauge body 10 and gauge face 36 are secured in place by a mounting stud 32. Mounting stud 32 penetrates through gauge housing 12 and is secured to gauge housing 12 by mounting stud nut 52. There can be more than one mounting stud 32.

Gauge housing 12 could be attached to gauge encasement 22 by many different methods as well. FIG. 5 illustrates one method. Gauge housing 12 is attached to left gauge panel 40 by gauge bolt 16. Gauge bolt 16 secures gauge housing 12 to left gauge panel 40 at first gauge mount location 46. Gauge bolt 16 begins from the inside of left gauge panel 40 going through gauge encasement 22 and into the back side of gauge housing 12. A second gauge bolt 16 is secured in the same manner.

The geometric structure of gauge housing 12, which provides an upward tilt to gauge face 36, is readily observable to the reader in FIG. 5. Side encasement bolt 18 is shown secured to front panel 38 and left gauge panel 40. Headlight 20 is located on the forward facing side of triple tree 34 while gauge face 36 is located on the rearward facing side of triple tree 34.

Figure 6:
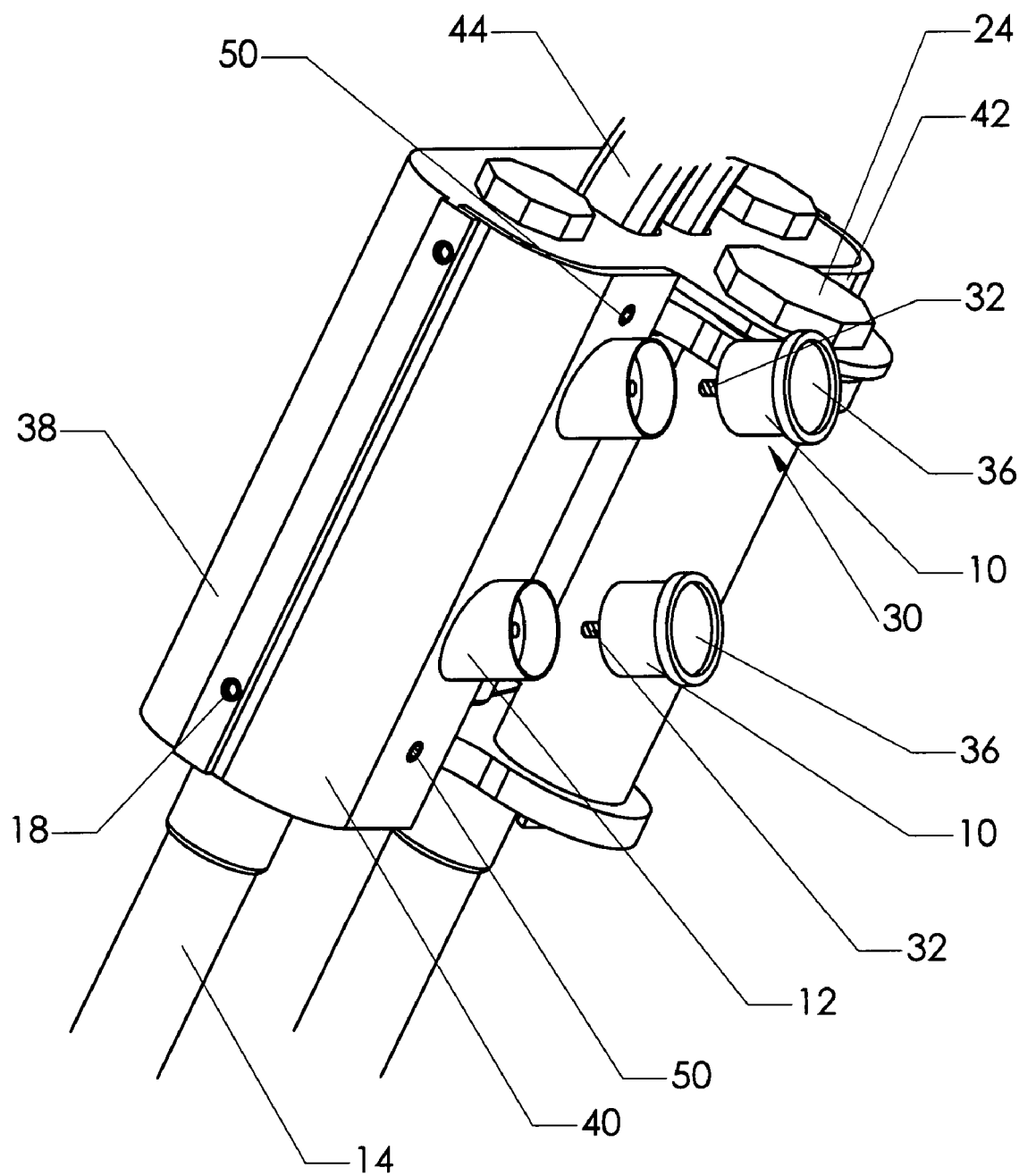
FIG. 6 is an exploded perspective view, showing one attachment means for a gauge mount.

FIG. 6 is a perspective view of gauge housing 12, gauge body 10 and gauge face 36, looking at gauge encasement's 22 rearward facing side. Gauge housing 12 is hollow to allow for the insertion of gauge body 10. Gauge housing 12 can be modified in order to fit a wide range of gauges on the market. For example, gauges may be available in different sizes or shapes or may have more than one mounting stud.

Figure 7:
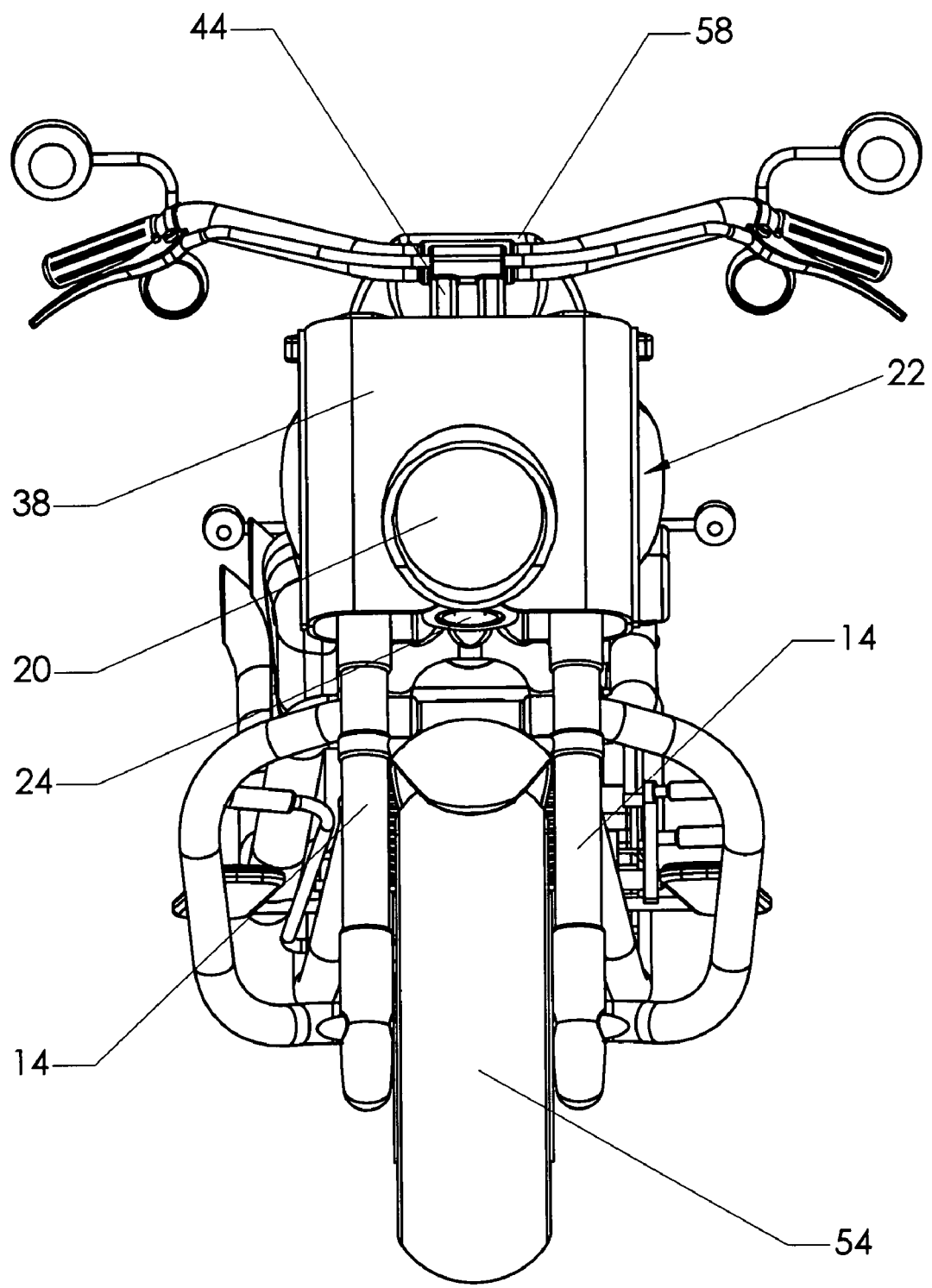
FIG. 7 is a perspective view, showing the appearance of the front of the motorcycle with the invention installed.

FIG. 7 shows the sleek appearance created by the application of the present invention. Gauge face 36 is not visible and handle bar 28 remains "clean". Front panel 38 is formed to fit around headlight 20. Handle bar 28 is not cluttered with one or more gauge 30. Handle bar 28 is "clean" and gauges 30 are attached to a part of the motorcycle which allows for a greater number of gauge attachments, while being largely hidden to an external observer.

Figure 8:
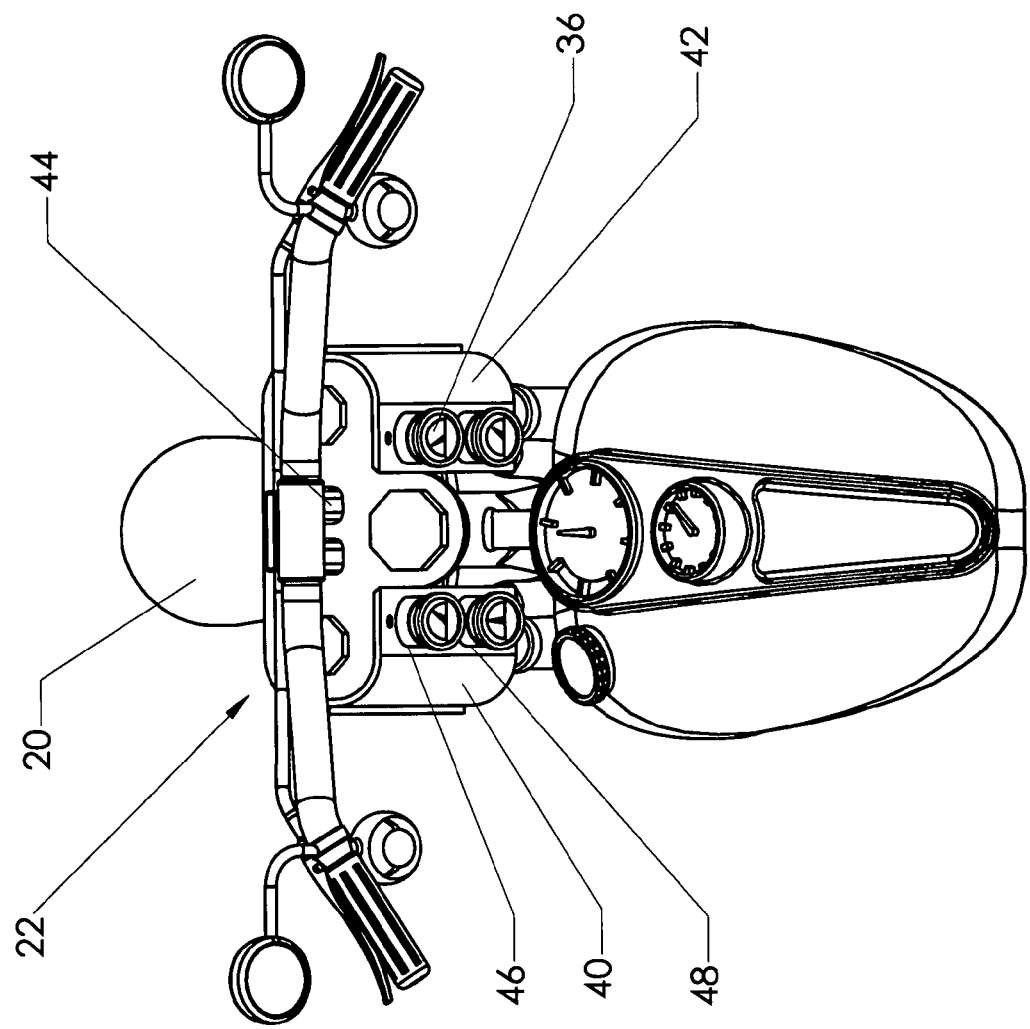
FIG. 8 is a perspective view, showing the gauges from a rider's perspective.

FIG. 8 illustrates the present invention from the perspective of a motorcycle rider operating the motorcycle. The reader can appreciate the visibility of gauge face 36. Second gauge mount location 48 is vertically offset from first gauge mount location 46 on left gauge panel 40 or right gauge panel 42. The rider can easily view all gauge mount locations, though the rider may have to lean forward slightly to see some locations. The rider may also need to lean left or right to fully visualize some gauge locations.

Figure 9:
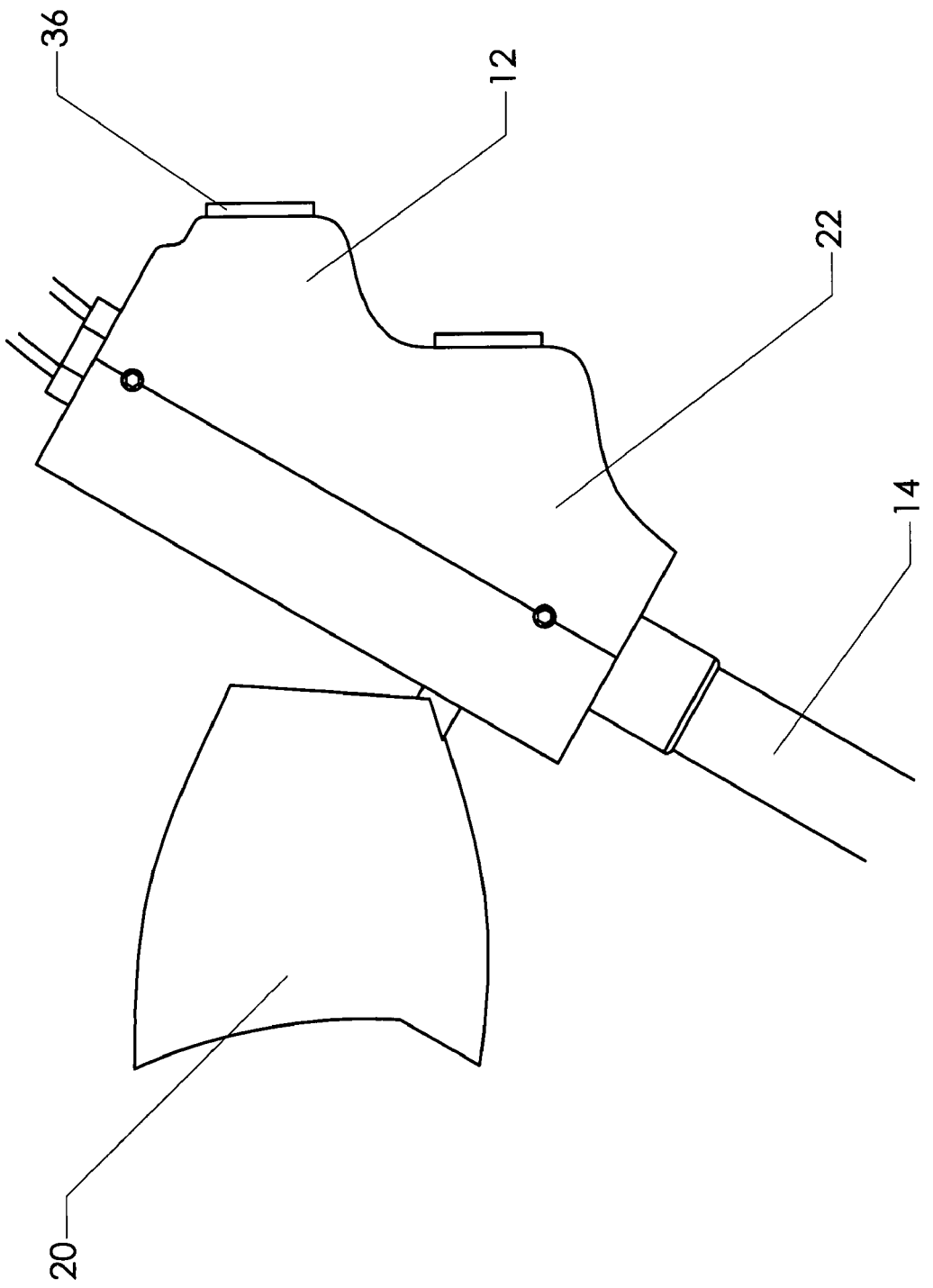
FIG. 9 is a detail view, showing the present invention as a molded gauge mount.

FIG. 9 illustrates an alternative embodiment of the present invention where gauge housing 12 and left gauge panel 40 or gauge housing 12 and right gauge panel 42 are unified as one integrally-molded or stamped piece. The reader will observe that the tilt of gauge face 36 is retained. The entire gauge encasement 22, comprised of left gauge panel 40, right gauge panel 42 and front panel 38, and gauge housing 12 could also be unified as one large piece. While this molded or stamped embodiment will not be described in further detail, those skilled in the art will readily understand how molded or stamped parts could be substituted for the panels shown in FIGS. 1-8.

The preceding description contains significant detail regarding the novel aspects of the present invention. It should not be construed, however, as limiting the scope of the invention but rather as providing illustrations of the preferred embodiments of the invention. As an example, gauge encasement 22 and gauge housing 12 could be made as one integrated unit molded to fit over handle bar 28 and around headlight 20 and pivot joint 24. It could also be made to frictionally engage around triple tree 34 as opposed to being bolted onto the triple tree 34. Gauge housing 12 could be formed to fit many different commercially available gauges. Gauge body 10 can come in many different shapes. First gauge mount location 46 and second gauge mount location 48 could be positioned on different areas of gauge encasement 22. Such variations would not alter the function of the invention. Thus, the scope of the invention should be fixed by the following claims, rather than by the examples given.

Having described my invention, I claim:

1. A gauge mount for attaching at least one gauge to a triple tree on a motorcycle, said motorcycle having a seat for accommodating a rider and a headlight, said triple tree having a rearward facing portion facing said seat, comprising:
    a. a gauge encasement configured to be attached to said triple tree;
    b. wherein said gauge encasement encloses and covers a portion of a first fork tube and a second fork tube;
    c. wherein said gauge encasement incorporates at least one gauge mount location configured to receive and attach said at least one gauge; and
    d. wherein when said gauge encasement is attached to said triple tree, said at least one gauge mount location is positioned on said rearward facing portion of said gauge encasement, so that when said at least one gauge is attached to said at least one gauge mount location, said at least one gauge is visible to said rider when said rider is seated in said seat.

2. The gauge mount of claim 1, wherein said gauge encasement comprises a left gauge panel and a right gauge panel.

3. The gauge mount of claim 2, wherein said gauge encasement further comprises a front panel.

4. The gauge mount of claim 1, wherein said gauge encasement is formed as a single piece.

5. The gauge mount of claim 1, wherein said gauge encasement is molded.

6. The gauge mount of claim 1, wherein said at least one gauge mount location includes at least one gauge housing.

7. The gauge mount of claim 6, wherein said gauge encasement and said at least one gauge housing are molded as a single piece.

8. The gauge mount of claim 6, wherein said at least one gauge housing is tilted upward.

9. The gauge mount of claim 1, wherein said gauge encasement has a cutout for said headlight.

10. The gauge mount of claim 1, wherein said gauge encasement passes completely around and enshrouds substantially all of said triple tree.

11. A gauge mount for attaching a plurality of gauges to a triple tree on a motorcycle, said motorcycle having a seat for accommodating a rider and a headlight, said triple tree having a rearward facing portion facing said seat, a pivot joint, a first fork tube, and a second fork tube, comprising:
    a. a gauge encasement configured to be attached to said triple tree;
    b. wherein said gauge encasement encloses and covers a portion of said triple tree;
    c. wherein said gauge encasement incorporates a plurality of gauge mount locations configured to receive and attach said plurality of gauges; and
    d. wherein when said gauge encasement is attached to said triple tree, said plurality of gauge mount locations are positioned on said rearward facing portion of said triple tree, so that when said plurality of gauges are placed in said plurality of gauge mount locations, said plurality of gauges are visible to said rider when said rider is seated in said seat.

12. The gauge mount of claim 11, wherein said plurality of gauge mount locations includes a plurality of gauge housings.

13. The gauge mount of claim 12, wherein said plurality of gauge housings are tilted upward.

14. The gauge mount of claim 11, wherein said plurality of gauge mount locations have a first gauge mount location on left rearward facing side of said gauge encasement.

15. The gauge mount of claim 13, wherein said plurality of gauge mount locations have a second gauge mount location on left rearward facing side of said gauge encasement.

16. The gauge mount of claim 15, wherein said second gauge mount location is vertically offset from said first gauge mount location.

17. The gauge mount of claim 11, wherein said plurality of gauge mount locations have a first gauge mount location on right rearward facing side of said gauge encasement.

18. The gauge mount of claim 17, wherein said plurality of gauge mount locations have a second gauge mount location on right rearward facing side of said gauge encasement.

19. A gauge mount for attaching at least one gauge to a motorcycle, said motorcycle including a frame, a headlight, and a seat for accommodating a rider, comprising:
   a. a triple tree pivotally attached to said frame, said triple tree mounting a first fork tube and a second fork tube;
   b. said triple tree including a rearward facing portion facing said seat;
   c. a gauge encasement attached to said rearward facing portion of said triple tree;
   d. wherein said gauge encasement encloses and covers a portion of said first fork tube and said second fork tube;
   e. wherein said gauge encasement is configured to allow maximum rake of said triple tree;
   f. wherein said gauge encasement incorporates at least one gauge mount location positioned on a rearward facing portion of the gauge encasement configured to receive and attach said at least one gauge; and
   g. wherein said at least one gauge mount location is configured to receive and position said at least one gauge so that said at least one gauge is visible to said rider when said rider is seated in said seat.

20. The gauge mount of claim 19 wherein said at least one gauge mount location includes at least one gauge housing.

* * * * *